Aug. 6, 1957     C. C. HANSEN     2,801,523
DEFROSTING APPARATUS FOR REFRIGERATION SYSTEMS
Filed May 15, 1952     2 Sheets-Sheet 1
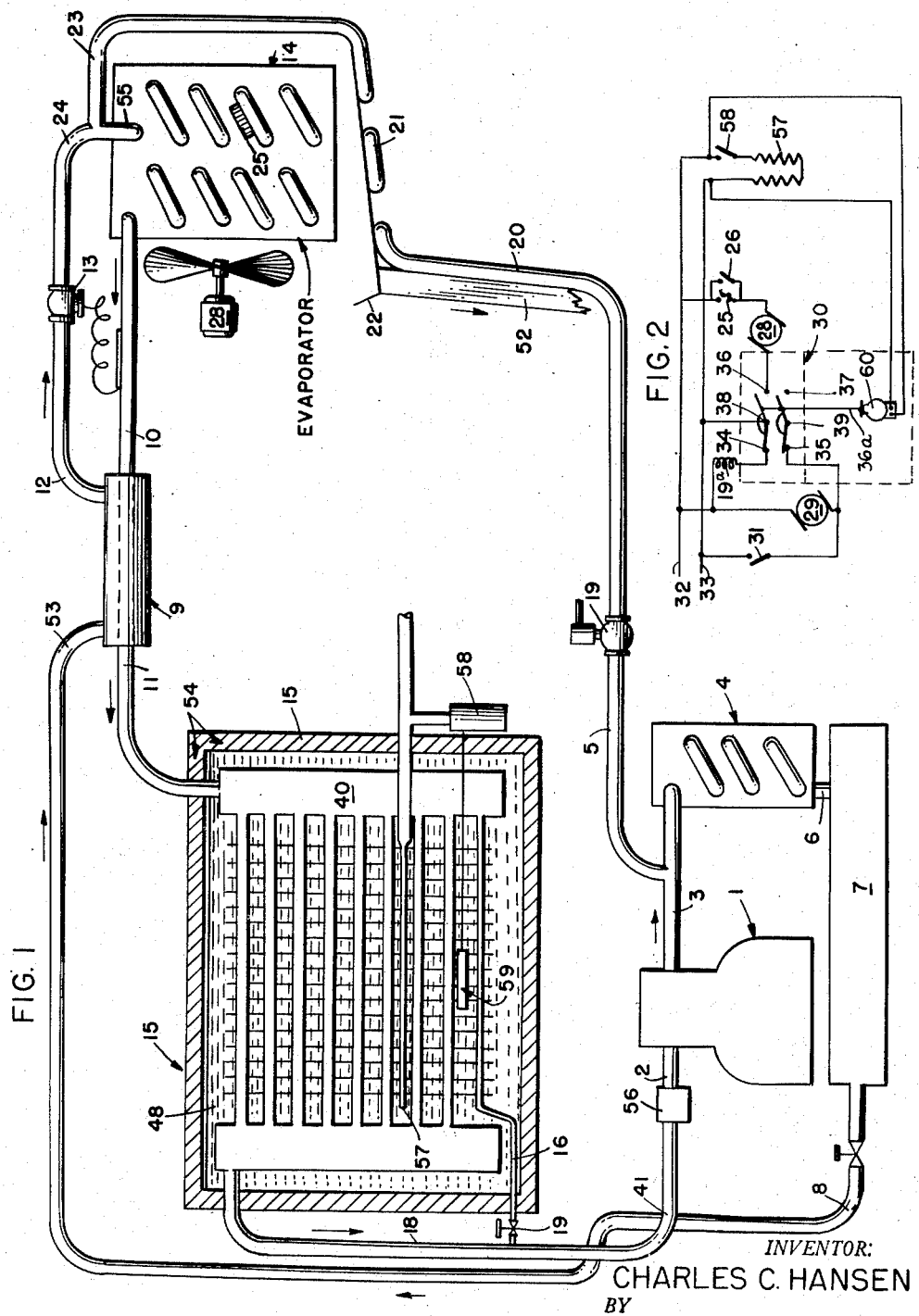
INVENTOR:
CHARLES C. HANSEN
BY
ATT'Y Aug. 6, 1957    C. C. HANSEN    2,801,523
DEFROSTING APPARATUS FOR REFRIGERATION SYSTEMS
Filed May 15, 1952    2 Sheets-Sheet 2
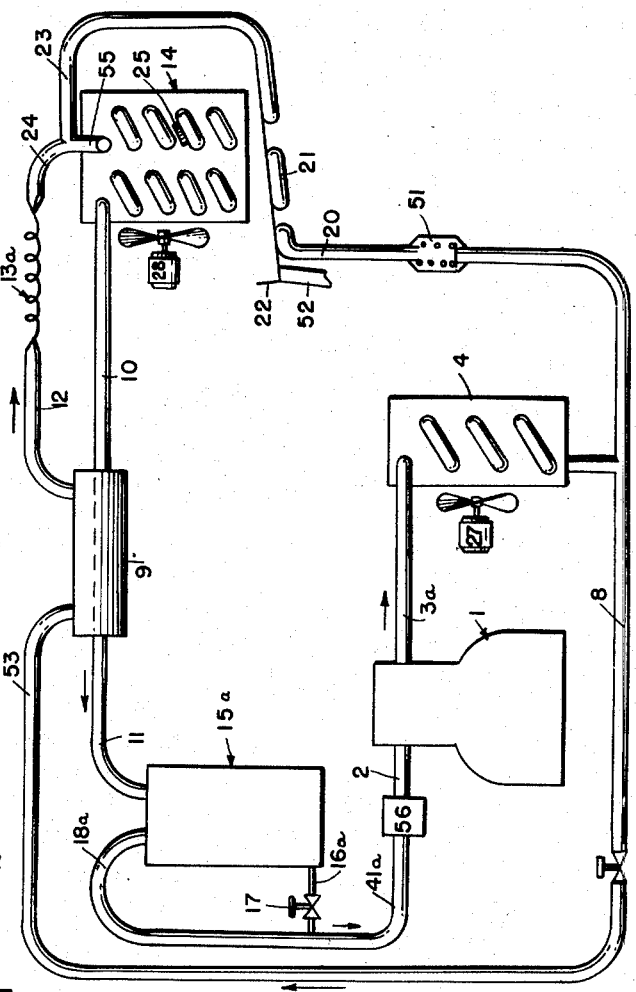
INVENTOR:
CHARLES C. HANSEN
BY
ATT'Y

United States Patent Office 2,801,523
Patented Aug. 6, 1957

2,801,523

DEFROSTING APPARATUS FOR REFRIGERATION SYSTEMS

Charles C. Hansen, Clarendon Hills, Ill.

Application May 15, 1952, Serial No. 287,987

6 Claims. (Cl. 62—3)

This invention relates generally to refrigerating apparatus, and, more particularly, to the defrosting of evaporators or cooling units used in mechanical refrigeration systems.

Of the many systems which have been proposed or used to remove frost or ice from evaporators or cooling units, one of the most potentially successful has involved the method of defrosting the refrigerating evaporator or cooling unit of a refrigeration system by passing periodically, at intervals according to frost conditions on the evaporator or cooling unit surface, hot, gaseous refrigerant from the refrigeration compressor direct to said evaporator or cooling unit and in heat exchanging relation with the evaporator's drain pan and drain pipe.

One difficulty involved in this system is the necessity of trapping and re-evaporating such refrigerant as is condensed to a liquid in the evaporator or cooling unit during the defrosting period. This must be done to prevent the return of harmful liquid refrigerant to the compressor valves and to provide gas to be again pumped by the compressor and then again condensed in the evaporator, this process continuing until defrosting is accomplished.

Of those systems used to accomplish this trapping and re-evaporating those which have been devised or used have one or more of the following disadvantages: bulkiness, costliness, operation at elevated temperature, slowness in re-evaporation, necessity for connecting large electrical service line, necessity for bypassing suction gas around the re-evaporator during normal refrigeration period, necessity for heavily insulating re-evaporator to prevent heat losses to surroundings, necessity for collecting condensed water vapor from the outside of the re-evaporator, necessity for locating re-evaporator in an ambient temperature above the freezing temperature of water.

This invention contemplates the elimination of these disadvantages in a system using gaseous refrigerant to defrost the evaporator or cooling unit by using for re-evaporation heat storage the latent heat of fusion from liquid to solid of a substance whose freezing point is above the freezing point of water.

An object of this invention is to provide a refrigeration apparatus having ability to periodically and automatically initiate, continue for the optimum duration, and terminate a defrosting operation for the evaporator.

Another object consists in providing a heat storage reservoir of great compactness which will, during normal cooling operation of the refrigeration system, store at a substantially constant temperature, above the melting temperature of the frost, sufficient heat to melt the accumulated frost on the refrigeration apparatus.

Another object consists in providing a heat storage reservoir which will act as a sink to store heat at a substantially constant temperature which is low enough to receive heat from any heat source which is at a temperature as little as 10° Fahrenheit above the freezing point of the frost, thereby permitting the use of many heat sources such as a compressor discharge refrigeration gas line, compressor lubrication oil line, compressor liquid refrigerant line, a steam line, a hot water line, a normal cold water line, room air, chemical reaction heat, solar radiant heat, ground heat, electrical heat, or any other source of heat at a temperature slightly above the melting point of the accumulated frost.

Another object consists in providing apparatus capable of transferring heat from the heat source to the heat storage reservoir material during normal cooling operation and during defrost operation, and also apparatus capable of rapidly tranferring heat from the progressively freezing heat storage reservoir material to the refrigerant fluid during the defrost period and shortly thereafter.

Another object consists in providing apparatus capable of receiving, storing, and re-evaporating any liquid refrigerant passing out from the evaporator suction line during a defrost period, thereby enabling the refrigerant to be returned to the compressor suction port in the form of a gas.

Another object consists in providing a storage medium whose freezing point is above the freezing point of water, thereby enabling a great storage of heat in a small space at a substantially constant and moderate temperature level due to the great ability of certain substances to store latent heat when melted to a liquid.

Another object consists in providing an insulated shell for the heat storage reservoir to permit operation of the heat storage reservoir without regard to ambient temperature surrounding the heat storage reservoir and without danger of moisture condensing on the outside of the heat storage reservoir during the defrost period.

Another object consists in providing a simple, rapid, low cost defrost system for refrigeration systems with air-cooled refrigeration condensing units having separate condenser fan motors.

Another object consists in providing a method of evaporator fan control for forced convection evaporators which will, at the conclusion of a defrost period, prevent the water left on the evaporator surface by defrosting from being blown into the refrigerated space.

Other objects, advantages, and features will be apparent from the accompanying drawings or will be pointed out in the description to follow.

In the drawings:

Figure 1 is a partly diagrammatic side elevation of the refrigeration apparatus as it might be used in a commercial, industrial, or domestic refrigeration system;

Figure 2 is a diagrammatic sketch of the electrical circuit, used to automatically control defrosting of the system of Figure 1;

Figure 3 is a diagrammatic sectional side view of a method of construction of the latent heat re-evaporator and accumulator;

Figure 4 is a diagrammatic sketch of the refrigeration apparatus as modified for use with low temperature refrigeration systems having separate condenser motor-fans; and Figure 5 is a diagrammatic sketch of the electrical circuit used to automatically control defrosting the system of Figure 4.

In Figure 1 is a partly diagrammatic illustration of a defrosting system incorporating the invention. A conventional positive displacement type of refrigeration compressor 1 is driven by a motor (not shown) either integral with said compressor or connected to it by shafts, couplings, or belt.

During the cooling cycle (subject to the control of a cooling thermostate or pressurestat 31), this compressor 1 draws refrigerant gas from a suction line 2 and pumps the refrigerant to a discharge line 3, whence it enters a condenser 4, which may be of any well-known type in the refrigeration industry, air-cooled as is shown, water-cooled, or evaporatively-cooled by air and water. The refrigerant is changed in the condenser from a vapor or gas to a liquid, which passes through a conduit 6 to a refrigerant receiver 7, of any common construction familiar to the art of refrigeration.

From the receiver 7, the refrigerant liquid passes through a pipe 8 into a suction-liquid heat exchanger 9, which may be of any usual design but specifically possessing ample heat exchange surface to cool the liquid passing therethrough down to a temperature approaching that of the suction gas entering the heat exchanger through a suction conduit 10. Said liquid refrigerant, now sub-cooled, passes through a pipe 12 to enter a thermostatic expansion valve 13, the construction and functioning of which is well known to those versed in the manufacture of refrigeration apparatus. By means of the expansion valve 13, the liquid is expanded to a lower pressure in an evaporator 14, which is drawn as a conventional forced convection finned tube evaporator, but which may be any other form of evaporator, such as pipe coils, plates, gravity finned coils, or other types which might collect frost.

From the evaporator 14, the refrigerant now in essentially gaseous form with some entrained oil, passes through the suction conduit 10 into previously mentioned suction-liquid heat exchanger 9. In passing through the heat exchanger, the suction gas is warmed almost to the temperature of the liquid refrigerant entering the heat exchanger 9 from a liquid line 53. This warmed suction gas and oil enters a combination accumulator and latent re-evaporator 15 through a conduit 11. Inasmuch as this suction gas is approximately the same temperature as or slightly warmer than the conduit in the latent re-evaporator, the suction gas normally does not cool the latent re-evaporator as it passes through the latent re-evaporator during a cooling cycle. Oil returning with the suction gas tends to drop to the bottom of the accumulator conduit, from where the oil runs off through a small tube 16 having a restriction (or a valve 17, Fig. 3) to regulate flow into a suction line 41, from where the oil is returned in the necessary manner to the compressor. The suction gas leaves the latent re-evaporator through a pipe 18 from the top of the re-evaporator conduit.

A typical wiring circuit is shown in Fig. 2 for automatically controlling the cooling apparatus and defrosting operation of this refrigeration system.

A timer switch 30 is of any well known design which may be a double-pole, double-throw type as shown, having a definite, regular, periodic, defrost time interval during which contacts 38 and 39 are connected only to contacts 34 and 35 respectively. Between these defrost intervals, during the regular cooling cycle, contacts 38 and 39 are connected only to contacts 36 and 37 respectively.

During normal cooling cycle, current flows from a supply line 33 through the refrigeration control 31, represented as a switch, which may be the common thermostat or pressurestat familiar to the refrigeration industry, to a refrigeration compressor motor 29 and back to a current supply line 32. The contact 38 is connected to the contact 36, completing a circuit to the evaporator blower fan motor 28, subject to the requirements of the thermostat swich 25 that the evaporator 14 be below freezing temperature before the evaporator fan motor circuit is complete. The thermostat 25 is electrically connected in parallel with the switch 26 which is kept closed only during the period when it is necessary to cool the cold storage space when the storage space is at a temperature above freezing.

An electric heater 57, which is located in the accumulator re-evaporator housing in contact with the re-evaporator conduit and extended heat transfer surfaces, is connected to a source of electric power from lines 32 and 33 through thermostat switch 58, whose temperature sensing element is located in the combination accumulator and latent re-evaporator 15. Current flows through heater 57 until the temperature in the accumulator about a thermostat element 59 rises above the freezing point of the latent heat storage material, at which time the contact of thermostat 58 opens and the heater circuit is broken.

During a defrost cycle, the following occurs: the connection of contact 38 to 36 is broken, opening a circuit which includes an evaporator blower motor 28 and causing it to stop. The contact 38 is connected to the contact 34 causing the hot gas solenoid valve coil 19a to receive current and the valve 19 to open. The contact 39 is connected to the contact 35, causing the compressor motor 29 to run regardless of whether the contacts of thermostat 31 are opened or closed.

After an interval of time of normal refrigeration operation determined by the requirements of the individual refrigeration system application, sufficient frost deposits on the evaporator 14 to make frost removal desirable in order to maintain the cooling efficiency of the evaporator. This is accomplished in the following manner: A defrost time clock, as is commonly used in the art of refrigeration to control defrosting, closes an electrical circuit (as described in connection with Fig. 2) to keep the compressor running, opens a circuit to stop an evaporator fan motor if any fan is used, and electrically opens a hot gas solenoid valve 19, which is a conventional solenoid valve widely used in the art of refrigeration, thereby allowing compressor discharge gas to pass from the pipe 3 through the pipe 5 through the solenoid valve 19 into a pipe 20, which is in close thermal contact with the cooling unit drain line and with a cooling unit drain pan 22 along its pan bottom 21.

The hot gas enters an evaporator pipe 24 between the thermal valve 13 and the evaporator 14 through a pipe 23. Once in the evaporator, the hot gas melts the frost on the outside of the evaporator 14 and, in so doing, part of the hot gas refrigerant condenses back to liquid refrigerant. The combined liquid and gaseous refrigerant leaves the evaporator through pipe 10, pass through the heat exchanger 9 and drop into the combination accumulator and latent re-evaporator 15, where the liquid refrigerant and oil drop to the bottom while the refrigerant gas immediately passes across through the re-evaporator conduit into the suction line 18.

Since the saturated suction temperature which exists in the evaporator 14 during the frost melting period of a defrost interval is slightly higher than the melting temperature of the frost and the evaporator heat transfer but lower than the freezing point of the latent heat storage material in the latent re-evaporator 15, heat flows from the heat storage material to the external surfaces of the accumulator and re-evaporator conduit and into the liquid refrigerant which lies inside of the latent heat storage re-evaporator, thereby causing the liquid refrigerant to boil off to a gas, whence it is returned to the suction line 18. During this process, the latent heat storage material is progressively freezing on the outside of the re-evaporator surface as the material's latent heat is being transferred to the liquid refrigerant. This defrosting process continues until ended by the defrosting timer switch, at which time frost has melted from the evaporator's surfaces and run out through the drain pipe, most of the liquid refrigerant has been boiled out of the accumulator, and much of the latent accumulator material has frozen as its latent heat was removed by the re-evaporating refrigerant.

Typical latent heat material which may be used in carrying out this invention together with their approximate freezing points are well known among which are mentioned in the August 1936 Handbook of Chemistry and Physics, acetic acid, melting point 62° F., glycerin, melting point 64° F., ethyl anthranilate, melting point 55° F., Dowtherm A, a eutectic mixture of diphenyl and diphenyl oxide, manufactured by the Dow Chemical Co., and has a freezing point of 53.6° F., and a latent heat of fusion of 64 B. t. u. per pound. In addition, this liquid does not expand when freezing and therefore will not cause damage when frozen by extended surface fins of the heat transfer surface. By using this latent heat storage material, this system has a cold operating temperature during normal refrigeration between defrost periods and may therefore be regarded as a cold cycle system as it operates at an average of 50–55° F. depending upon the latent heat storage material which is used.

The process of changing from defrosting cycle back to cooling cycle consists of closing the solenoid valve 19 by means of electrical contacts in the timer, and putting the compressor motor back under the control of the cooling thermostat. After the evaporator coil has cooled to a temperature below freezing, an evaporator fan motor 28 is started by the closing of a thermostat switch 25. Thus, the system once again operates on the cooling cycle described previously. During this cooling cycle, heat is applied to the interior of the combination accumulator and latent re-evaporator 15 by means of an electrical heating element or elements in thermal contact with the conduit and extended heat transfer surfaces of the combination accumulator and latent re-evaporator. As heat is supplied, the frozen latent heat storage material in the combination accumulator and latent re-evaporator gradually melts away from the conduit surfaces and extended heat transfer surfaces towards that latent heat storage material midway between fins or tubes or at any location more remote from the re-evaporator conduit and extended heat transfer surfaces such as far corners and ends of the tank.

The thermostat is located in the latent heat storage material at a place where the melting tends to occur last. The thermostat is set at a temperature above the melting point of the latent heat storage material. Consequently, the electric heater will supply heat until practically all of the latent heat storage material has been melted. At this time, the latent heat storage material around the thermostat will have melted and warmed sufficiently to cause the contacts of the thermostat to open thereby interrupting the electric current supplied to the heater and discontinuing the heating process.

The heater thermostat contacts then remain open until, as previously described, the latent heat storage material is partially frozen by the entry of slugs of liquid refrigerant into the combination accumulator and latent re-evaporator 15, as during the subsequent following defrosting cycle.

In Fig. 3 is a partly diagrammatic side view of a combination accumulator and latent re-evaporator 15a which incorporates features of the invention.

Suction gas or liquid or a combination of gas and liquid leave the evaporator 14 through its suction line 10 and pass through the suction-liquid heat exchanger 9, as was explained previously, and then enter the combination accumulator and latent re-evaporator 15a through the conduit 11, which enters a header conduit 40a in such a way that any liquid returning with the suction gas is directed downward toward the bottom of the conduit 40a by an opening 49 at the end of the conduit 11.

During normal cooling operation, any liquid returning through the conduit 11 is primarily composed of small quantities of a mixture of refrigerant and oil. Upon reaching the bottom of the header conduit 40a, this liquid passes through a metering hole 50 and into the oil drain tube 16. During its passage through the tube 16, which is surrounded by latent heat storage material 48, most of the refrigerant is vaporized, and, after passing through the optional restricter or metering valve 17, enters the compressor suction pipe 41a in gaseous form. The accompanying oil, however, does not vaporize, but enters pipe 41a as a continuous trickle of oil, proceeding to the compressor suction port by virtue of accompanying high velocity refrigerant gas in pipe 41a. Also, during such period of the normal cooling operation, refrigerant gas entering the conduit 40a through the end opening 49 in the conduit 11 tends to pass through conduits such as 42, 43, 44, 45 and 46 to a header conduit 47 where the gas leaves through an opening 33a to enter the suction pipe 18 and passes thence to compressor suction pipe 41a. During this normal cooling operation, unless the latent heat storage material has melted and warmed enough to open the circuit of the thermostat 58a, heat is still being supplied to the electric heater 57a. This heat is transmitted by direct thermal contact from the surface of the heater 57a to the re-evaporator conduit and its extended heat transfer surface and then by direct thermal contact to the adjacent latent heat storage material 48, causing this material to gradually melt and thereby store heat for the following defrost cycle.

This stored heat is retained within the combination accumulator and latent re-evaporator by an insulated housing 54a and by virtue of the fact that suction gas entering through conduit 11 has been warmed by suction liquid exchanger 9, so that the suction gas is substantially the same temperature as or warmer than the storage material 48.

During a defrosting operation, refrigerant gas and slugs of liquid refrigerant enter through the opening 49 from which the liquid falls to bottom of the header conduit 40a. Consequently, all liquid refrigerant and any accompanying oil tends to lie in conduit 40a and in lower portions of connecting conduits 42, 43, 44, 45 and 46. The small amount of liquid refrigerant which passes through the tube 16 into the compressor suction pipe 41a is largely vaporized during travel through pipe 16 and therefore causes no harm to the compressor. The liquid refrigerant in conduits such as 42, 43, 44, 45 and 46 and conduits 40a and 47 is rapidly vaporized by heat which travels from latent heat storage material 48, through and along the tube walls and connecting fins 48a and into the lower temperature liquid refrigerant. First, a small amount of sensible heat leaves material 48 and then the relatively large amount of latent heat leaves material 48 and material 48 begins to freeze to the fins and outside tube surfaces. Heat is transferred along the fin 48a and along the tube walls from all portions of material 48 to the rapidly vaporizing liquid refrigerant in the bottom section of the combination accumulator and latent re-evaporator conduit means 15b in the combination accumulator and latent re-evaporator 15a. Gas which vaporizes travels to the top of conduit means 15b and leaves through the conduits 33a and 49 to suction pipe 18. When the defrost cycle concludes and normal refrigeration begins once again, any liquid refrigerant in the bottom of the combination accumulator and latent re-evaporator rapidly vaporizes and cooling resumes in the evaporator.

Sometime during the defrost cycle, the thermostat 58a is cooled to its cut-in temperature, closing the circuit to the heater, which once again commences to store heat in the latent heat material 48 for use in the next defrost cycle.

A partly diagrammatic illustration of a defrosting system incorporating the invention appears in Fig. 4 which is suitable for use especially with compressors having separate condenser fans, such as hermetic units, but also for use with compressors having water-cooled condensers or evaporative condensers.

A conventional positive displacement type refrigeration compressor 1 is driven by a motor 29 shown only in the wiring diagrams. During normal cooling operation, the compressor discharges refrigerant gas through pipe 3a and into the condenser 4, which is cooled by a separate motor-fan 27. Liquid refrigerant passes through the liquid pipe 8 and through the heat exchanger 9, which is a type common to the art of refrigeration, but specifically having sufficient heat exchange surface to warm the suction gas nearly to the liquid temperature. The cooled liquid refrigerant passes through the pipe 12 into the expansion device 13a which may be a thermal expansion valve, a capillary tube, or any other type of expanding device. Here the liquid refrigerant expands to the evaporator 14 and leaves essentially in gaseous form through the evaporator suction pipe 10 and into the heat exchanger 9, previously described. After being warmed by the heat exchanger 9, the suction gas with entrained oil passes through the pipe 11 and into the combination accumulator and latent re-evaporator 15a, one form of which has been previously described for Figure 3. The suction gas leaves through the pipe 18a and the oil leaves through the conduit 16 and the optional restricter or metering valve 17. Suction gas and oil enter the pipe 41a before passing through a compressor suction pressure regulating valve 56, an automatic downstream pressure regulator which acts to prevent the compressor motor from being overloaded by high suction pressure and whose construction and use is well known to those skilled in the art of refrigeration.

During the defrosting periods, the following operation occurs: an automatic defrosting control 60 opens the electrical circuit to the condenser motor fan 27, it opens an electrical circuit to the evaporator motor fan 28, and it simultaneously shorts out the refrigeration control 31, causing the compressor to surely run whether its contacts are opened or closed, as previously described.

Stoppage of the condenser motor fan 27 causes the air-cooled condenser 4, which is of any well-known type, to lose its condensing capacity, resulting in a rise in compressor discharge pressure until the opening pressure setting of a hot gas valve 51 is exceeded. This valve 51 is located between pipe 8 and the pipe 20 and may be a diaphram check valve or a spring loaded check valve of common variety but having a special heavy spring which will prevent the check valve from opening until the discharge pressure is high enough to give rapid hot gas defrosting of the evaporator. This opening discharge pressure is usually 25 or more pounds per square inch higher than normal discharge pressures which exist during the refrigeration cycle. In lieu of a check valve, the valve 51 may be a diaphragm gas pressure regulating valve which is common to the art of refrigeration.

Compressor discharge gas passes through condenser 4 to pipe 8, leaves through valve 51, and passes through the pipes 20 and 21, entering the evaporator feed line at 23, which is on the evaporator side of the expansion device 13a. The hot gas cools and condenses into liquid form as it gives up heat to the evaporator 14, which results in melting the frost on the outside of the evaporator and also causes a rise in tube temperature to open the contacts of the thermostat 25. The refrigerant gas and liquid from the evaporator pass through the heat exchanger 9 and enter the combination accumulator and latent re-evaporator 15a through the pipe 11 where liquid accumulaton and re-evaporation occur as described previously for Figure 1 and Figure 3.

At the conclusion of the defrost cycle, an automatic defrosting control timer motor and cam 66 closes the electrical circuit to the condenser fan 27, restores the compressor motor circuit to operation by the refrigeration control, and closes the break in the electrical circuit to evaporator fan 28. Operation of the condenser fan 27 results in lowering head pressure to a value low enough to cause the valve 51 to close, thus ending the supply of defrosting gas to the evaporator. The evaporator motor fan 28, however, does not start until the thermostat 25 closes a circuit therefor. The thermostat 25 is a temperature controller whose contacts close upon reaching a certain low temperature. In thermal contact with the evaporator 14, the thermostat 25, set to close contacts at a temperature below the freezing point of the frost, cannot therefore immediately close contacts to complete the electrical circuit to evaporate motor fan 28. Consequently, the evaporator motor fan 28 cannot operate until any water clinging to the evaporator surfaces as a result of defrosting has re-frozen from refrigerant evaporation of a normal cooling cycle.

In Fig. 5 is shown a typical wiring circuit for automatically controlling cooling operation and defrosting operation of the refrigeration system of Fig. 4. The defrost timer switch 60a is of any well-known design which may be double-pole, double-throw as shown, having a definite, regular, periodic, defrost time interval during which contacts 38 and 39 actuated by timer motor and cam 66 and a pressure operator 30a are connected only to contacts 36 and 37 respectively. Between these defrost intervals, that is, during the regular cooling cycle, the contacts 38 and 39 are caused by the cam 66 to connect only to the contacts 34 and 35 respectively.

During a normal cooling cycle, current flows from the current supply line 33 to the refrigeration control 31, thence to the refrigeration compressor motor 29 and back to the other current supply line 32. The contact 39 is connected to the contact 37, completing a circuit to the condenser motor fan 27. The contact 38 is connected to the contact 36 completing a circuit to the evaporator blower motor 28, subject to the requirement of the thermostat switch 25 that the evaporator be below freezing temperature before the evaporator motor fan circuit is complete. The thermostat 25 is electrically connected in parallel with the switch 26 which is manually closed during any period when it is necessary to cool the cold storage space, when the cold storage space is a temperature above freezing.

The electric heater 57a, which is located in the combination accumulator and latent re-evaporator housing, thermally contacts the re-evaporator conduit and its extended surface, receives power from supply lines 32 and 33 through the thermostat switch 58a, whose temperature sensing element is located in the latent heat storage material 48. Current flows through heater 57a until the temperature in the accumulator adjacent to the thermostat element 59 rises above the freezing point of the latent heat material, at which time the contacts of the thermostat 58a open and the heater circuit is broken.

At the time of defrosting, the timer motor and cam 66 opens contacts 38 and 39 from 36 and 37, respectively, causing the evaporator motor fan 28 to stop and condenser motor fan 27 to stop. Also, the contacts 39 to 35 are closed, causing the compressor motor 29 to run regardless of whether the thermostat 31 has its contacts open or closed. The defrost cycle is terminated by the timer switch 60a at whichever occurs first, the end of a pre-set time interval causing timer motor and cam 66 to trip the timer switch contacts, or the attainment in the evaporator of a pressure high enough to cause pressure operator 30a to trip the timer switch contacts. The pressure operator 30a trips the timer switch contacts by means of a bar indicated in Fig. 5 as a dotted line 36a from the pressure operator 30a to the rigid arms of switch contacts 38 and 39 and one end operated by the cam 66.

Although this invention has been described for forced convection evaporators, it applies equally well to all other types of evaporators, such as gravity fin coils, pipe coils, cold plates, liquid coolers, ice makers, air conditioner evaporator coils, heat pump evaporators, or ice builder evaporators.

Although this invention has been described for elimination of water frost, it also applies to the periodic defrosting of any types of evaporator or cooling unit collecting frozen material other than water frost.

Although shown as an accumulator re-evaporator located in a refrigeration suction line, this invention applies to any kind of conduit connecting to the evaporator, said conduit having external surface in contact with a material having high latent heat of fusion and whose melting point is higher than the melting point of the frost it is desired to remove from the exterior of the evaporator in such a relationship and arrangement of surface, that the greater portion of the latent heat storage material is very close to at least one section of the evaporator conduit external surface by use of closely spaced tubes, finned tubes, or any type of suitable extended external surfaces.

While preferred forms of this apparatus have been de-

I claim:

1. Refrigeration apparatus comprising a refrigeration vapor compressor, a condenser connected thereto by a discharge conduit, an evaporator, an expansion device, a liquid conduit from condenser exit through the expansion device to the evaporator, a heat exchanger in the liquid conduit from the condenser to the evaporator and in the suction conduit from the evaporator to the compressor, said heat exchanger transferring heat from the liquid to the suction gas between defrost periods, re-evaporator conduit means in the suction conduit between the exchanger and the compressor, an electric heater in thermal contact with said re-evaporator conduit means, latent heat storage material surrounding said conduit means having a definite freezing temperature higher than the freezing temperature of the evaporator frost and having an appreciable latent heat of fusion and a branch pipe from the condenser to the evaporator.

2. Refrigeration apparatus comprising a refrigeration vapor compressor, a condenser connected thereto by a discharge conduit, an evaporator, an expansion device, a liquid conduit from the condenser through the expansion device to the evaporator, a suction conduit from the evaporator to the compressor, a heat exchanger in the liquid conduit from the condenser to the evaporator and in the suction conduit from the evaporator to the compressor, said heat exchanger transferring heat from the liquid to the suction gas between defrost periods, re-evaporator conduit means in the suction conduit between the exchanger and the compressor, latent heat storage material surrounding said conduit means having a definite freezing temperature higher than the freezing temperature of the evaporator frost and having an appreciable latent heat of fusion and a branch pipe from the condenser to the evaporator.

3. Refrigeration apparatus comprising a refrigeration vapor compressor, a condenser connected thereto by a discharge conduit, an evaporator, an expansion device, a liquid conduit from condenser exit through the expansion device to the evaporator, a suction conduit from the evaporator to the compressor, a heat exchanger in the liquid conduit from the condenser to the evaporator and in the suction conduit from the evaporator to the compressor, said heat exchanger transferring heat from the liquid to the suction gas between defrost periods, re-evaporator conduit means in the suction conduit between the exchanger and the compressor, latent heat storage material surrounding said conduit means having a definite freezing temperature higher than the freezing temperature of the evaporator frost and having an appreciable latent heat of fusion, and a branch pipe from the condenser to the evaporator, and an upstream pressure regulating valve set to open upon a rise to a predetermined upstream pressure to allow refrigerant gas from the condenser exit to enter the evaporator during a defrost period.

4. Refrigeration apparatus comprising a refrigeration vapor compressor, a condenser connected thereto by a discharge conduit, an evaporator, an expansion device, a liquid conduit from condenser exit through the expansion device to the evaporator, a suction conduit from the evaporator to the compressor, a heat exchanger in the liquid conduit from the condenser to the evaporator and in the suction conduit from the evaporator to the compressor, said heat exchanger transferring heat from the liquid to the suction gas between defrost periods, re-evaporator conduit means in the suction conduit between the exchanger and the compressor, latent heat storage material surrounding said conduit means having a definite freezing temperature higher than the freezing temperature of the evaporator frost and having an appreciable latent heat of fusion, said re-evaporator conduit means having heat transfer fins extending throughout the latent heat storage material, and a branch pipe from the condenser to the evaporator.

5. Refrigeration apparatus comprising a refrigeration vapor compressor, a condenser connected thereto by a discharge conduit, an evaporator, an expansion device, a liquid conduit from condenser exit through the expansion device to the evaporator, a suction conduit from the evaporator to the compressor, a heat exchanger in the liquid conduit from the condenser to the evaporator and in the suction conduit from the evaporator to the compressor, said heat exchanger transferring heat from the liquid to the suction gas between defrost periods, re-evaporator conduit means in the suction conduit between the exchanger and the compressor, latent heat storage material surrounding said conduit means having a definite freezing temperature higher than the freezing temperature of the evaporator frost and having an appreciable latent heat of fusion, said re-evaporator conduit means having heat transfer fins extending throughout the latent heat storage material, and an electric heater in thermal contact with a number of said fins.

6. Refrigeration apparatus comprising a refrigeration vapor compressor, a condenser connected thereto by a discharge conduit, an expansion device, an evaporator, a liquid conduit from condenser exit through the expansion device to the evaporator, a suction conduit from the evaporator to the compressor, a heat exchanger in the liquid conduit from the condenser to the evaporator and in the suction conduit from the evaporator to the compressor, said heat exchanger transferring heat from the liquid to the suction gas between defrost periods, re-evaporator conduit means in the suction conduit between the exchanger and the compressor, latent heat storage material surrounding said conduit means having a definite freezing temperature higher than the freezing temperature of the evaporator frost and having an appreciable latent heat of fusion, said re-evaporator conduit means having heat transfer fins extending throughout the latent heat storage material, an electric heater in thermal contact with a number of said fins, and a branch pipe from the condenser to the evaporator.

References Cited in the file of this patent

UNITED STATES PATENTS

| | | |
|---|---|---|
| 2,281,770 | Hoesel | May 5, 1942 |
| 2,417,582 | Barfield | Mar. 18, 1947 |
| 2,440,146 | Kramer | Apr. 20, 1948 |
| 2,452,102 | Cocanour | Oct. 26, 1948 |
| 2,530,440 | Nussbaum | Nov. 21, 1950 |
| 2,555,161 | Smith | May 29, 1951 |
| 2,564,310 | Nussbaum | Aug. 14, 1951 |
| 2,635,433 | Schordine | Apr. 21, 1953 |
| 2,637,983 | Malkoff et al. | May 12, 1953 |
| 2,641,908 | La Porte | June 16, 1953 |
| 2,645,101 | La Porte | July 14, 1953 |
| 2,658,358 | Boling | Nov. 10, 1953 |
| 2,678,545 | Zearfoss | May 18, 1954 |